Figures 3, 4:
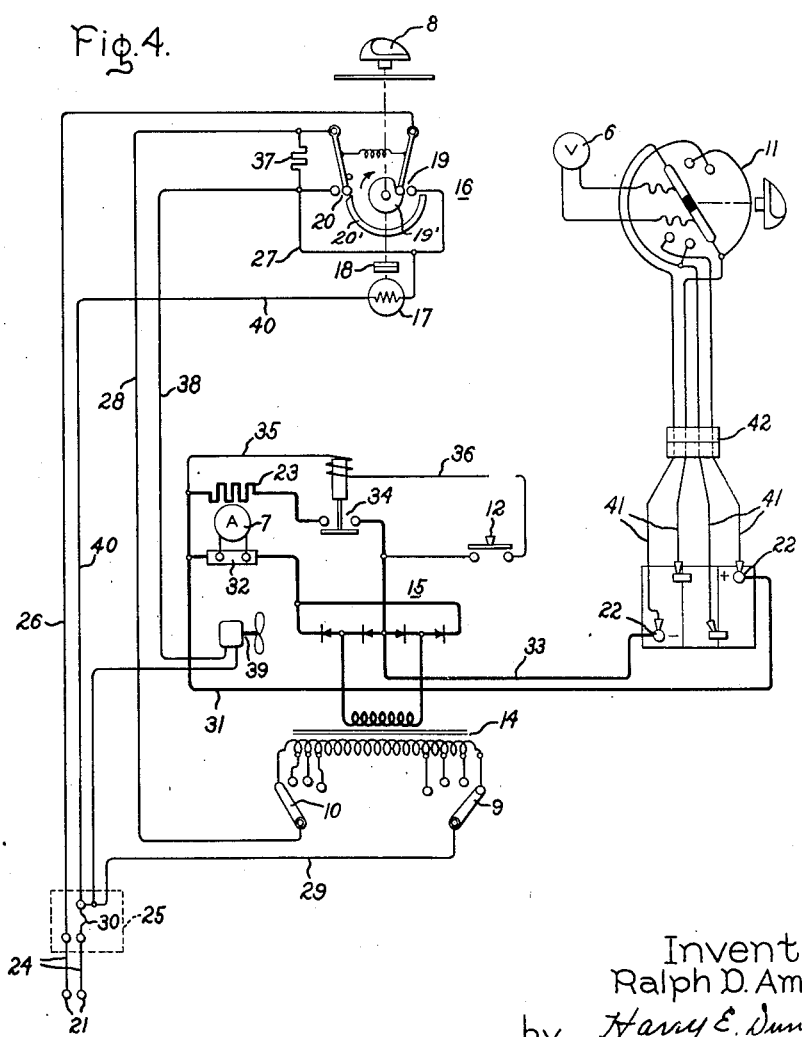

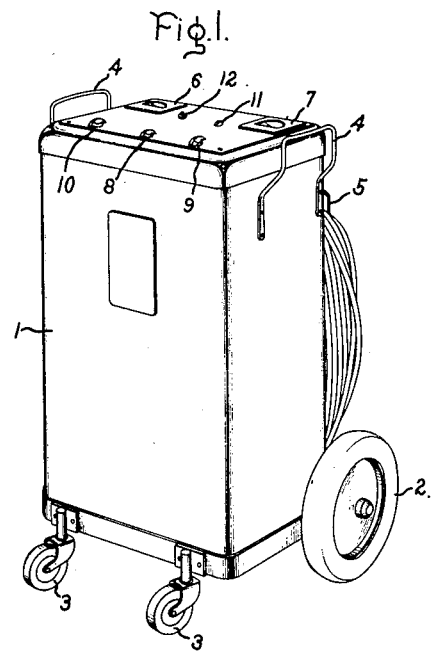
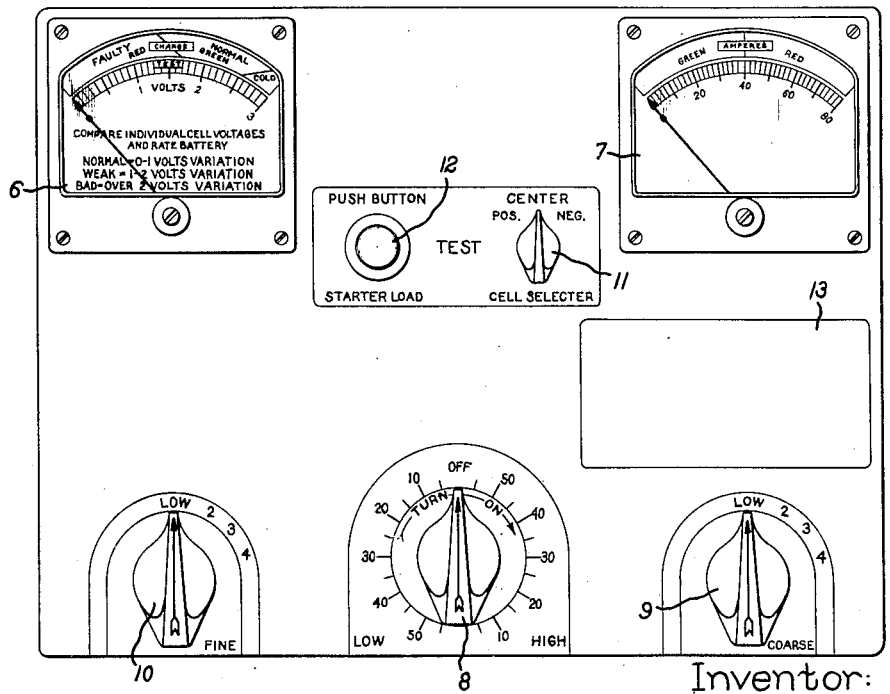

April 25, 1944.  R. D. AMSDEN  2,347,452
BATTERY SERVICING
Filed Feb. 17, 1942  2 Sheets-Sheet 2

| FOR 80F OR LOWER ELECTROLYTE TEMP. GRAVITY AT START | | | | | | | | | |
|---|---|---|---|---|---|---|---|---|---|
| AMP. HR. | 1150 | 1160 | 1170 | 1180 | 1190 | 1200 | 1210 | 1220 | 1230 |
|  | SET HIGH RATE TIME FOR MINUTES BELOW | | | | | | | | |
| 80 | 38 | 34 | 30 | 26 | 23 | 19 | 15 | 12 | 8 |
| 90 | 42 | 38 | 34 | 30 | 26 | 21 | 17 | 13 | 9 |
| 100 | 48 | 43 | 38 | 34 | 29 | 24 | 19 | 14 | 10 |
| 110 | 53 | 47 | 42 | 37 | 32 | 27 | 21 | 16 | 11 |
| 120 | 57 | 51 | 46 | 40 | 35 | 29 | 23 | 18 | 12 |
| 130 | 60 | 55 | 50 | 44 | 38 | 31 | 25 | 19 | 13 |

Inventor:
Ralph D. Amsden,
by Harry E. Dunham
His Attorney.

Patented Apr. 25, 1944

2,347,452

UNITED STATES PATENT OFFICE 2,347,452

BATTERY SERVICING

Ralph D. Amsden, Lynn, Mass., assignor to General Electric Company, a corporation of New York Application February 17, 1942, Serial No. 431,281

6 Claims. (Cl. 320—22)

This invention relates to storage battery servicing and more particularly to a new and improved method and apparatus for fast charging and accurately testing storage batteries, especially automobile batteries.

In accordance with this invention there is provided a novel and simple apparatus whereby automobile batteries can be rapidly charged in the car without disturbing their connections. It is characterized by setting the initial charging rate at a value of amperes which is numerically comparable with the ampere-hour rating of an average automobile battery, taper charging at constant supply voltage for a length of time which is proportional to the ampere-hours out of the battery and then charging at a much reduced rate for a fixed time.

Also incorporated in the charger is an accurate battery tester which has certain parts in common with the parts used in charging.

An object of the invention is to provide a new and improved method of fast charging storage batteries.

Another object of the invention is to provide a new and improved combined fast charger and tester for storage batteries, especially automobile batteries.

The invention will be better unde. stood from the following description taken in connection with the accompanying drawings and its scope will be pointed out in the appended claims.

In the drawings, in which like reference numerals designate the same elements throughout the several figures, Fig. 1 is a perspective view of a complete form of servicer embodying the invention, Fig. 2 is a plan view of the control panel of the servicer shown in Fig. 1, Fig. 3 is an enlargement of the scale indicated generally in Fig. 2, and Fig. 4 is a circuit diagram of the device shown in Fig. 1.

Referring now to the drawings and more particularly to Figs. 1 and 2, the servicer comprises a metal casing 1 mounted on a set of main wheels 2 and a set of casters 3 for permitting it to be steered and moved about easily. These operations are further facilitated by means of handles 4 fastened to opposite sides of the casing near the top thereof.

On the back side of the casing are brackets 5 upon which the incoming and outgoing leads or cables may be wound when the device is not in use. The top of the device serves as a control panel on which are mounted a voltmeter 6, an ammeter 7, a main control knob 8, a coarse step charging current adjuster 9 and a fine step charging current adjuster 10. Also mounted thereon is a voltmeter selector switch 11 for selectively connecting the voltmeter 6 across any one of the cells of a battery to be charged or tested or both. There is also a push button switch 12 for controlling the discharge of a battery for testing purposes. Also placed on the panel below the ammeter is a scale or table 13 for use in setting the main control knob 8. An enlargement of this scale is shown in Fig. 3.

The main elements of the charger circuit are a transformer 14 for supplying alternating current to the input terminals of a rectifier 15 which is preferably a bridge-connected copper-oxide rectifier. The energization of the transformer 14, while initiated manually by the control knob 8, is thereafter controlled automatically by means of a timer 16 consisting essentially of a timing motor 17 for driving the manually-operable control member 8 through an overdrive or slip clutch 18. The control member 8 in turn controls the sequential operation of two sets of contacts 19 and 20 by means of cams 19' and 20' respectively, both of which are mounted coaxially on the same shaft with the knob 8.

The circuit is provided with a pair of alternating-current input terminals 21 for connection across a standard constant voltage supply circuit, such as a circuit which feeds an ordinary household convenience outlet, and a pair of direct-current output terminals 22 for connection respectively to the terminals of a storage battery.

For use in testing the battery there is provided a special discharge resistor 23 having a resistance which is substantially the same as the equivalent resistance of an ordinary automobile starting motor whereby when it is connected across an automobile battery it will draw a discharge current of the order of 200 amperes.

The main supply circuit used in charging may be traced as follows: from the input terminals through a pair of conductors 24, through terminals on a fuse block 25. From the left-hand one of these fuse block terminals through a conductor 26, contacts 19, a jumper connection 27 in the timer, contacts 20, a conductor 28, the fine step tap-changing switch 10 to one of the finely spaced taps on the primary winding of the transformer 14, then through the primary winding to one of the coarsely spaced taps thereon, through the coarse step adjusting switch 9, a conductor 29 and through a fuse 30 to the right-hand side of the supply circuit. The secondary winding of the transformer 14 is connected to the alternating-current input terminals of the rectifier 15. The positive direct-current output terminal of the rectifier is connected to a flexible lead or conductor 31 through an ammeter shunt 32, while the negative terminal of the rectifier is connected directly to a flexible lead 33.

The discharge resistor 23 is arranged to be connected between the negative terminal of the rectifier and the junction of the lead 31 and the shunt 32 by means of a solenoid-operated switch 34. The operating solenoid of this switch is controlled by the push button switch 12, the energizing circuit for the solenoid being completed through conductors 35 and 36 which serve to connect this control circuit across the direct-current output leads 33 and 31.

For reducing the charging rate to a low value there is a resistor 37 which is normally short-circuited by the contacts 20 of the timer.

For cooling the rectifier there is a motor-operated fan 39 which is connected across the supply circuit through conductor 26, the contacts 19, jumper 27, a conductor 38 and the fuse 30 in series.

The timer motor 17 is connected across the supply circuit through the conductor 26, the contacts 19, a conductor 40 and the fuse 30 in series.

For enabling the selector switch 11 to connect the voltmeter 6 across any one of the three cells of an ordinary three-cell battery, four color-coded test jumpers 41 are provided. These have pointed connectors whereby they may be driven into the lead terminals and cell jumpers. They are connected with similarly color-coded leads leaving the selector switch by means of polarized connector 42.

The operation of the device is as follows: The terminals 21 are plugged into a convenience outlet and then a storage battery to be tested, charged or both, is connected between the output terminals 22. These terminals 22 preferably consist of relatively heavy clamps which are clamped onto the lead terminals of the battery without the necessity of disconnecting the normal battery connections. If these battery terminals are not readily accessible, the terminal clamps 22 may be connected to the frame of the automobile and to a live battery lead at any place where a terminal thereof is accessible, such for example as at a live terminal of the starter motor of an automobile. These terminal clips are preferably color-coded so that the positive is red and the negative is black and care should be taken to connect the red or positive clip to the positive terminal of the battery. If the polarity is correct there will be no sparking because the copper-oxide rectifier will prevent a reverse flow of current. However, if the polarity is incorrect there will be a spark due to the discharge current of the battery flowing through the rectifier.

If now it is desired to test the battery the push button 12 is depressed thereby causing the solenoid switch to close and connect the discharge resistor directly across the battery. The lower or test scale shown on the voltmeter should then be read and as soon as the reading is taken the push button should be released. This operation should be performed as quickly as possible so as not unnecessarily to discharge the battery. The selector switch should then be moved to connect the voltmeter across another cell whereupon the push button should be depressed and a second reading taken. This should then be repeated for the third cell and the battery should be rated according to the instructions on the voltmeter. This lower or test voltmeter scale is calibrated directly in volts and it provides a very accurate test of the battery because each of the cells is tested by the same voltmeter and under equal conditions.

For charging the battery the main control knob 8 is rotated slightly in a clockwise direction from its illustrated "off" position. This closes the contacts 19 and 20 thereby simultaneously energizing the transformer 14, the timer motor 17 and the fan motor 39. The coarse and fine step voltage adjusters 9 and 10 are then operated in conjunction with the ammeter so as to bring the charging current to a predetermined value. This value is a relatively high value which is of the order of the number of amperes corresponding numerically to the ampere-hour rating of an ordinary or average battery. A suitable value for this current is 80 amperes and as shown by the ammeter this value of 80 amperes represents full scale deflection. This is in order that the decrease in current as charging progresses due to the rise in battery voltage may be easily observed and accurately read on the ammeter and so that after a predetermined drop in current an accurate and easily read indication may be given that the battery is substantially charged. As shown on the ammeter, this is indicated by the main division on the upper scale between the red and green colored sectors.

Incidentally, it is for this reason that the discharge resistor 23 is so connected that the discharge current does not flow through the ammeter shunt. If the ammeter were to respond to the heavy discharge current so that this discharge current represented full scale ammeter deflection then all of the charging current range would take place over an ammeter deflection of around one-half or one-third of the full scale range and it would be more difficult to read the ammeter accurately.

After the charging current has been set at its maximum value the pointer 8 is rotated to a point on the high rate time scale corresponding to the number of minutes which the battery should be charged at the high rate. This time setting is substantially directly proportional to the ampere-hour rating of the battery and is inversely proportional to its state of charge. In other words, it is proportional to the ampere-hours by which the battery is short a full charge. This setting may readily be determined by reference to the table 13 placed on the control panel of the charger directly beneath the ammeter and shown enlarged in Fig. 3. The state of charge of the battery is measured by an accurate hydrometer which gives the specific gravity of the battery's electrolyte. The ampere-hour rating of the battery is usually stamped on it and having obtained this data the proper time setting may easily be found from the table.

The timer motor will then drive the main control or operating member 8 in the forward (clockwise) direction at a constant speed of one-half revolution per hour and when the high rate time is us the cam 20' which extends over only 180 degrees will allow the contacts 20 to be snapped open thereby opening the short-circuit around the resistor 37. When this resistor is inserted in the primary circuit of the transformer 14 the charging rate is reduced to a relatively low value, such for example as twenty amperes. This low rate charge is then continued for an hour and at the expiration of this time the cam 19' allows the contacts 19 to reopen thereby resetting the circuit by de-energizing the transformer 14, the motor 17 and the fan 39. The battery should now be fully charged.

The battery may then be tested again.

It will be observed that the voltmeter has an upper or charging scale having a center normal zone (preferably colored green), a left-hand zone (preferably colored red) and labeled "Faulty" and a right-hand (white) zone labeled "Cold." Immediately after charging has started the selector switch should connect the voltmeter across each of the cells and the voltmeter should be read on the upper or charging scale. If any one of the battery cells is short-circuited, the voltmeter reading will be in the red zone indicating a faulty cell. If an otherwise sound battery is at unusually low temperature, its resistance may be relatively high so that the voltmeter pointer will swing over to the cold zone. However, the battery should soon become warmed due to the passage of the high charging current. If the battery is extremely cold gassing may be excessive, in which case charging should be reduced until the battery warms up.

There is, however, another battery condition known as sulphation which gives the battery a high resistance and which will cause the voltmeter pointer to swing over to the cold range. This condition, however, can readily be distinguished from a cold battery, first by noting whether or not the battery is cold and second by whether or not there is excessive gassing because excessive gassing will always be present in a sulphated battery when it is charged at the high rate. For desulphating a battery it should be charged at the low rate for about thirty minutes and this can be done readily by rotating the main control member 8 three-quarters of a revolution from its "off" position so as automatically to give a one-half hour low rate charge. The battery should then be completely discharged by pressing the test or discharge button until the voltmeter needle begins to drop rapidly indicating that the battery has been substantially fully discharged. This discharging of the battery may overheat the discharge resistor and consequently it is advisable to do this discharging when the charger is set at its low charging rate so that the fan will be operating and will cool the discharge resistor.

The parts are disposed in the casing 1 in such a manner that the cooling fan is placed over the rectifier and the rectifier is placed over an opening in the bottom of the casing while the fan discharges through an opening in the back side of the casing. In this manner the fan aids the natural flow of convection air currents tending to cool the rectifier.

It should be understood that the above-described method of fast charging a storage battery may be carried out equally well by hand and that it is not essential to have automatic timing or automatic cut-off of charging.

While there has been shown and described a particular embodiment of this invention, it will be obvious to those skilled in the art that various changes and modifications can be made therein without departing from the invention and, therefore, it is aimed in the appended claims to cover all such changes and modifications as fall within the true spirit and scope of the invention.

What I claim as new and desire to secure by Letters Patent of the United States is:

1. A battery charger comprising, in combination, a pair of input terminals for connection across a supply circuit, a pair of output terminals for connection across a storage battery to be charged, a first set of contacts, a second set of contacts, said contacts being connected in series with each other for controlling the energization of said output terminals from said input terminals, an impedance connected across said second set of contacts, a timing motor connected across said input terminals through said first set of contacts, manually rotatable means for closing said first set of contacts in all positions of said means except an "off" position thereof so as to complete a connection between said pairs of terminals through said sets of contacts in series and so as to energize said motor through said first set of contacts, said means opening said first set of contacts when it is returned to said "off" position, and an overrunning connection between said motor and said rotatable means whereby said motor drives said means and said means can be manually rotated faster than said motor drives it, said means opening said second set of contacts when it has rotated a predetermined fraction of a revolution so as to reduce the charging rate to a relatively low value by inserting said impedance in the connection between said pairs of terminals.

2. A battery charger comprising, in combination, a pair of input terminals for connection across a supply circuit, a pair of output terminals for connection across a storage battery to be charged, a first set of contacts, a second set of contacts, said contacts being connected in series with each other for controlling the energization of said output terminals from said input terminals, an impedance connected across said second set of contacts, a timing motor connected across said input terminals through said first set of contacts, manually and unidirectionally rotatable means for closing said first set of contacts in all positions of said means except an "off" position thereof so as to complete a low impedance high charging rate connection between said pairs of terminals through said sets of contacts in series and so as to energize said motor through said first set of contacts, said means snap-opening said first set of contacts when it is returned to said "off" position, and an overrunning connection between said motor and said rotatable means whereby said motor drives said means and said means can be manually rotated faster than said motor drives it, said means opening said second set of contacts when it has rotated a half revolution so as to reduce the charging rate to a relatively low value by inserting said impedance in the connection between said pairs of terminals.

3. A fast servicer for automobile batteries comprising, in combination, a rectifier, a voltage step-down transformer for energizing said rectifier, a set of taps in a winding of said transformer for adjusting the unidirectional battery charging current of said rectifier to a predetermined high initial value of amperes which is of the order of magnitude of the ampere-hour rating of an average six-volt automobile battery, an impedance connected in series with said transformer, a switch connected in series with the primary winding of said transformer, said switch having a manually rotatable operating member for closing it in all positions except in an "off" position, a motor electrically connected to be energized by the closing of said switch and mechanically connected through a clutch to drive said member forward toward its "off" position, a second switch for short-circuiting said impedance, said operating member having means for opening said second switch throughout its second half revolution in the forward direction of rotation, said impedance when said second switch is open serving to reduce said charging current to a low finishing value, an ammeter connected in the output circuit of said rectifier whereby the charging current flows therethrough, said ammeter being calibrated so as to have substantially full scale deflection when the charging current is at said predetermined initial high value, a discharge resistor having a resistance substantially equal to the equivalent resistance of an average automobile starter motor, a manually controllable switch for connecting said discharge resistor across the output circuit of said rectifier through said ammeter whereby the relatively very high battery discharge current will not flow through said ammeter when said last-mentioned switch is closed, a voltmeter, and means including a selector switch for selectively connecting said voltmeter across the cells of the battery undergoing charge and test.

4. A fast servicer for automobile batteries comprising, in combination, a bridge-connected copper-oxide rectifier, a voltage step-down transformer for energizing said rectifier, a set of coarse taps in the primary winding of said transformer for adjusting the unidirectional battery charging current of said rectifier to a predetermined high initial value of amperes which is of the order of magnitude of the ampere-hour rating of an average six-volt automobile battery, a set of fine vernier taps in the primary winding of said transformer for accurately adjusting said current, an impedance connected in series with the primary winding of said transformer, a switch connected in series with the primary winding of said transformer, said switch having a manually rotatable operating member for closing it in all positions except in an "off" position, a motor electrically connected to be energized by the closing of said switch and mechanically connected through a clutch to drive said member forward toward its "off" position, a second switch for short-circuiting said impedance, said operating member having means for opening said second switch throughout its second half revolution in the forward direction of rotation, said impedance when said second switch is open serving to reduce said charging current to a low finishing value, an ammeter shunt connected in the output circuit of said rectifier whereby the charging current flows therethrough, an ammeter connected across said shunt, said ammeter being calibrated so as to have substantially full scale deflection when the charging current is at said predetermined initial high value, a discharge resistor having a resistance substantially equal to the equivalent resistance of an average automobile starter motor, a manually controllable switch for connecting said discharge resistor across the output circuit of said rectifier through said ammeter shunt whereby the relatively very high battery discharge current will not flow through said ammeter shunt when said last-mentioned switch is closed, a voltmeter having separate charge and discharge scales, and means including a selector switch for selectively connecting said voltmeter across the cells of the battery undergoing charge and test.

5. The method of fast charging a storage battery of any ampere-hour capacity and state of charge which comprises connecting a substantially constant supply voltage across said battery through means having impedance so as to produce a tapering charging current, making said voltage of such value that the initial magnitude of said charging current is a constant which is substantially numerically equal in amperes to the ampere-hour rating of an average battery, continuing said taper charge for a definitely predetermined length of time which is substantially directly proportional to the ampere-hour capacity of said battery and which is inversely proportional to its state of charge, then reducing said tapering current to a relatively low value by increasing the value of said impedance, continuing charging for a fixed time at the low rate, and then disconnecting said battery from said source of supply voltage.

6. The method of fast charging a storage battery of any ampere-hour capacity and state of charge which comprises connecting a substantially constant supply voltage across said battery through means having impedance so as to produce a tapering charging current, making said voltage of such value that the initial magnitude of said charging current is substantially 80 amperes, continuing said taper charge for a definitely predetermined length of time which is substantially directly proportional to the ampere-hours out of said battery divided by said initial value of current in amperes, then reducing said tapering current to substantially 20 amperes by increasing the value of said impedance, continuing charging for substantially one hour at the low rate, and then disconnecting said battery from said source of supply voltage.

RALPH D. AMSDEN.